United States Patent
Bahahlul et al.

(10) Patent No.: US 10,036,144 B2
(45) Date of Patent: Jul. 31, 2018

(54) VALVE ASSEMBLY FOR PREVENTION OF WATER FREEZING AND STAGNATION

(71) Applicants: Yoel Bahahlul, Jordan Valley (IL); Amir Davidesko, Binyamina Givat Ada (IL)

(72) Inventors: Yoel Bahahlul, Jordan Valley (IL); Amir Davidesko, Binyamina Givat Ada (IL)

(73) Assignee: A.R.I. Fluid Control Accessories Ltd., Kfar Charuv (IL)

( * ) Notice: Subject to any disclaimer, the term of this patent is extended or adjusted under 35 U.S.C. 154(b) by 2 days.

(21) Appl. No.: 14/995,319

(22) Filed: Jan. 14, 2016

(65) Prior Publication Data

US 2017/0204591 A1   Jul. 20, 2017

(51) Int. Cl.
*E03B 7/12*   (2006.01)
*F16K 24/04*   (2006.01)

(52) U.S. Cl.
CPC .............. *E03B 7/12* (2013.01); *F16K 24/042* (2013.01); *F16K 24/044* (2013.01); *Y10T 137/5497* (2015.04); *Y10T 137/6552* (2015.04); *Y10T 137/6947* (2015.04)

(58) Field of Classification Search
CPC ................ F03B 7/12; Y10T 137/6947; Y10T 137/6552; Y10T 17/5497; E03B 7/12; F16K 24/042; F16K 24/044
See application file for complete search history.

(56) References Cited

U.S. PATENT DOCUMENTS

| | | | | |
|---|---|---|---|---|
| 3,628,617 A * | 12/1971 | Ferrigan | ................ | G01G 13/00 177/116 |
| 4,793,938 A * | 12/1988 | Dayton | ................ | B01D 35/12 134/10 |
| 4,838,483 A * | 6/1989 | Nurczyk | ............. | F24F 11/0001 236/49.3 |
| 6,019,116 A * | 2/2000 | Schell | ................... | B67D 7/007 137/14 |
| 6,622,930 B2 * | 9/2003 | Laing | ....................... | E03B 7/12 137/59 |
| 7,506,617 B2 * | 3/2009 | Paine | ...................... | F23N 1/082 122/448.3 |
| 8,226,832 B2 * | 7/2012 | Angelilli | ................ | C02F 1/763 210/739 |
| 8,498,523 B2 * | 7/2013 | Deivasigamani | ... | F24D 17/0026 392/307 |

(Continued)

OTHER PUBLICATIONS

PCT Search Report and Written Opinion PCT/IB2016/050132, dated Apr. 5, 2017.

*Primary Examiner* — Craig Schneider
*Assistant Examiner* — Kevin Barss
(74) *Attorney, Agent, or Firm* — Dekel Patent Ltd.; David Klein

(57) ABSTRACT

A valve assembly includes a valve installed in a fluid/liquid supply line, and a water circulation pipe that has a first end in fluid communication with a water supply line and a second end in fluid communication with an inner volume of the valve. Some water flowing in the water supply line is diverted through the water circulation pipe and circulates in the valve. The water that is diverted through the water circulation pipe and circulates in the valve has a sufficient flow to prevent freezing and/or water stagnation in the valve.

16 Claims, 9 Drawing Sheets

(56) References Cited

U.S. PATENT DOCUMENTS

2013/0209078 A1* 8/2013 Pushpala ............... A47J 31/542
                                                         392/451
2013/0333775 A1    12/2013 Shoval
2016/0003368 A1    1/2016 Ogen

* cited by examiner

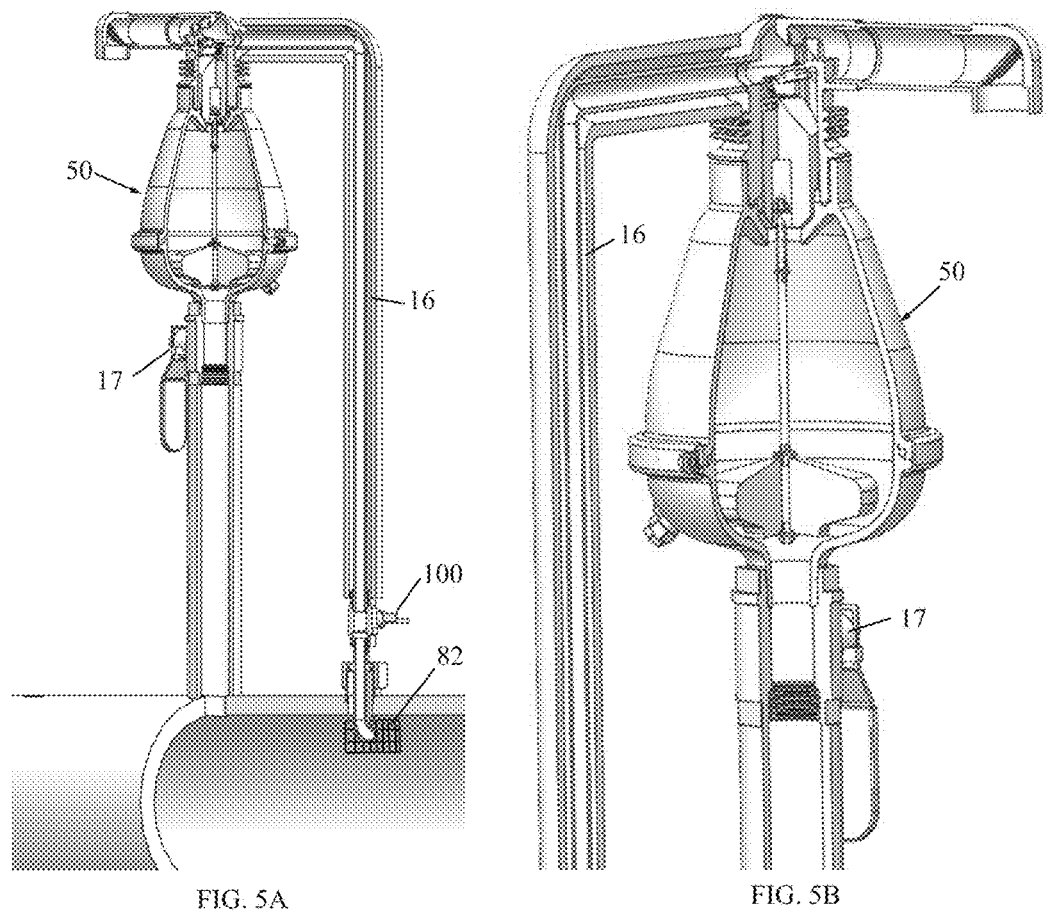

VALVE ASSEMBLY FOR PREVENTION OF WATER FREEZING AND STAGNATION

FIELD OF THE INVENTION

The present invention relates generally to valves, such as those used in water distribution systems, and more specifically to a valve assembly that prevents water freezing and stagnation.

BACKGROUND OF THE INVENTION

Stagnant water in water distribution systems for municipalities poses a problem contamination of potable water. Stagnation is found in water piping systems and reservoirs that do not have sufficient flow to keep the water active, where water remains still for long period of time.

Stagnant water in municipal piping systems is a major cause of bad water taste, foul odors in water, discoloration of water, buildup of sediments in residential hot water reservoirs, and bacterial growth in toilet reservoirs and drains of bathroom accessories. Stagnant water can cause many illnesses, such as digestive problems.

Generally, municipal water supply systems are flushed periodically to discharge stagnant water and to eliminate concentrations of chlorine or other disinfectants used in water supply systems which tend to accumulate at regions of low flow.

Another problem associated with low flow or water stagnation in cold climates is the possibility of water freezing in the pipes, which can cause the pipes to crack or burst. Often taps are purposely left open to allow a continuous flow of water so that during the sub-zero temperatures of the winter water will not freeze in the pipes. This of course has the disadvantage of wasting water.

The problems of stagnant water and of freezing are particularly troublesome for air valves, air release valves or air and vacuum valves in pipeline systems.

SUMMARY OF THE INVENTION

The present invention seeks to provide a valve assembly that prevents water freezing and stagnation in the valve, as is described more in detail hereinbelow.

There is thus provided in accordance with an embodiment of the invention a valve assembly including a valve installed in a water supply line, and a water circulation pipe that has a first end in fluid communication with a water supply line and a second end in fluid communication with an inner volume of the valve, such that some water flowing in the water supply line is diverted through the water circulation pipe and circulates in the valve. The water that is diverted through the water circulation pipe and circulates in the valve has a sufficient flow to prevent freezing and/or water stagnation in the valve.

In accordance with an embodiment of the invention the second end of the water circulation pipe is in fluid communication with an upper inner volume of the valve.

In accordance with an embodiment of the invention the valve includes an air release valve and/or an air and vacuum valve.

The first end of the water circulation pipe may be downstream or upstream or flush with an inlet of the valve.

In accordance with an embodiment of the invention the water circulation pipe branches into a plurality of branches both of which are in fluid communication with different portions of the valve.

In accordance with an embodiment of the invention the water circulation pipe is covered by thermal insulation.

There is also provided in accordance with an embodiment of the invention a method for improving performance of a valve installed in a water supply line including installing a water circulation pipe such that a first end thereof is in fluid communication with a water supply line and a second end thereof is in fluid communication with an inner volume of a valve installed in the water supply line, such that some water flowing in the water supply line is diverted through the water circulation pipe and circulates in the valve.

BRIEF DESCRIPTION OF THE DRAWINGS

The present invention will be understood and appreciated more fully from the following detailed description taken in conjunction with the drawings in which:

FIGS. 5A-5B are simplified illustrations of a valve assembly, constructed and operative in accordance with yet another non-limiting embodiment of the present invention;

DETAILED DESCRIPTION OF EMBODIMENTS

Figure 1:
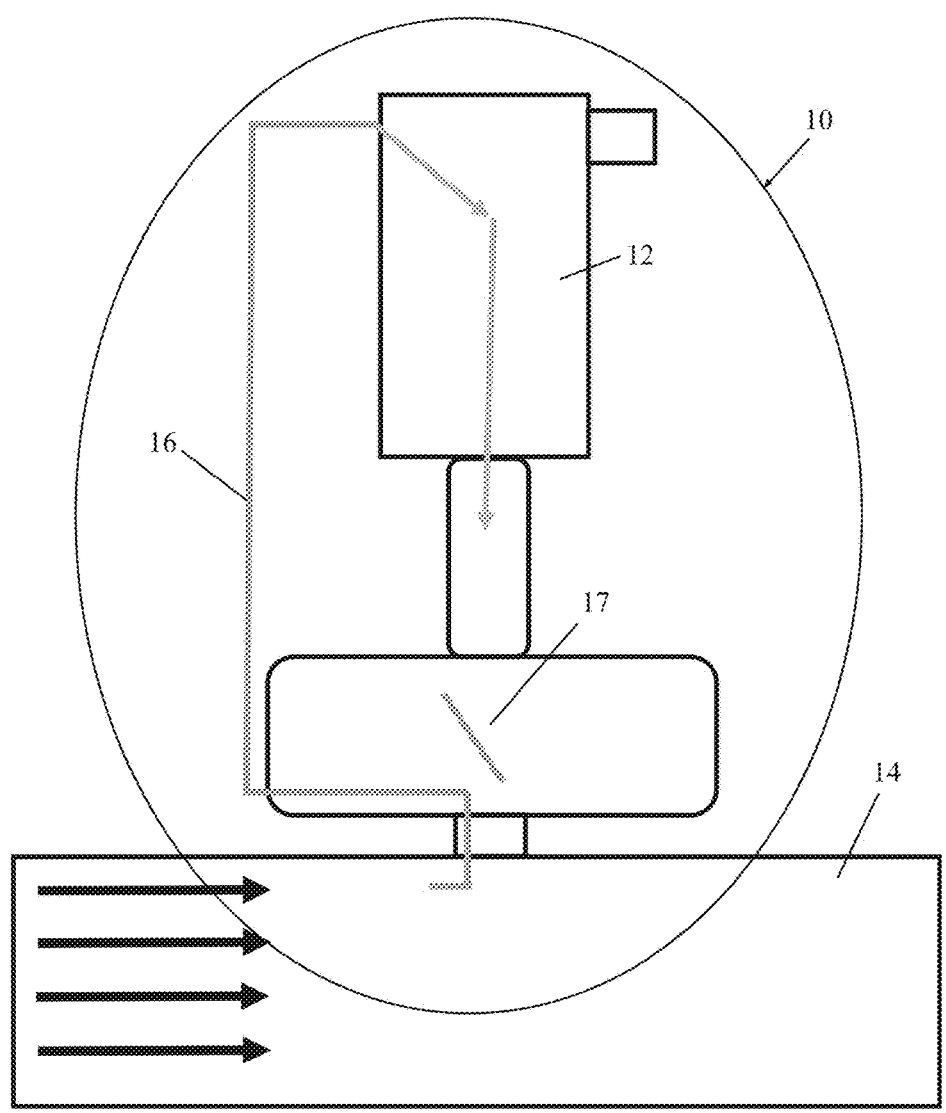
FIG. 1 is a simplified illustration of a valve assembly, constructed and operative in accordance with a non-limiting embodiment of the present invention.

Reference is now made to FIG. 1, which illustrates a valve assembly 10, constructed and operative in accordance with a non-limiting embodiment of the present invention.

Valve assembly 10 includes an air valve 12 installed in a water supply line 14. The air valve 12 may be used in a water transmission system. Air valves in pipeline systems serve two primary functions. The first is the release of accumulated air that comes out of solution within a pressurized pipeline. This air results in bubble formation, which can gather at localized high points along the pipeline profile. The air accumulation occurs when the bubble's buoyancy is greater than the energy to convey the bubble with the liquid. The air valve releases the free air and is also known as an air release valve.

The second function of an air valve is to admit air into the system when the internal pressure of the pipeline drops below atmospheric pressures. By admitting air into the pipeline as the internal vacuum condition develops, the magnitude of the vacuum pressure can be reduced and as a result help prevent the pipeline from experiencing excessive deflection and/or collapse as well as help prevent the formation of a full vacuum condition in which vapor cavities may form from the fluid vaporizing. The air valve used in this situation is also called an air and vacuum valve. The air and vacuum valve is used to discharge large volumes of air from the pipeline system when the pipeline is initially filled and after water column separation.

As will be noted below, the invention is not limited to air valves. It is noted that the invention is not limited to use with water, but rather may be used for any liquid, fluid or flowable matter, and the term "water" in the specification and claims encompasses any liquid, fluid or flowable matter.

In accordance with an embodiment of the invention, a water circulation pipe 16 diverts some flow of water from the water supply line 14 to an upper portion of air valve 12. The water circulation pipe 16 has one end in fluid communication with water supply line 14 and another end in fluid communication with an inner volume of valve 12. In a preferred embodiment, the water circulation pipe 16 is a Pitot tube, but other shapes of circulation pipes may be used. The water diverted to valve 12 enters an upper volume (or other suitable place) of the valve 12, flows down through the inner parts of valve 12 and thus causes circulation of water in the valve 12. This circulation prevents freezing and stagnation of the water in the valve 12.

Surprisingly, it has been found that the added water circulation in the air valve 12 does not interfere with any functions of air valve 12, whether used as an air release valve or as air and vacuum valve. The invention is not only applicable for air valves, but also for any valve, such as but not limited to, check valves, one way or non-return valves. In addition, despite the relative small volume of the valve 12 as compared with the rest of the water supply line 14, it has been surprisingly found that the water flow through circulation pipe 16 is sufficient to successfully prevent freezing and stagnation.

The inlet to water circulation pipe 16 may be positioned upstream of, or flush with, an inlet to valve 12 from the water supply line 14 as in FIG. 1. The inlet to water circulation pipe 16 faces upstream. Alternatively, the inlet to water circulation pipe 16 may be positioned to face downstream or two pipes may be used, one facing upstream and the other facing downstream, as seen later in FIG. 8. The water circulation pipe 16 may be installed external to the valve 12, as in FIGS. 3A-5B, in which the water circulation pipe 16 has one end connected to the water supply line and the other end connected to the inner chamber of the valve. Alternatively, as shown in FIG. 1, water circulation pipe 16 may pass through a separation valve 17, which is installed between the valve 12 and the water supply line 14.

The following describes calculations performed in design of the water circulation pipe 16 and experiments that were done to verify the calculations and to prove the concept works.

The heat loss to the environment through the wall thickness of the water circulation pipe is given by:

$$q_e = K\left(\frac{A}{B}\right)\Delta T_p$$

where $q_e$=heat loss to the environment
K=thermal conductivity of pipe material
A=area of pipe in contact with surroundings
B=pipe wall thickness
$\Delta T_p$=temperature difference between water in pipe and surroundings The heat gained by the water flowing in the circulation pipe is given by:

$$q_p = \dot{M}C\Delta T_w$$

where $q_p$=heat gain in pipe
$\dot{M}$=mass flow of water in circulation pipe
C=heat capacity of water
$\Delta T_w$=temperature difference between entrance and exit of water in the circulation pipe In order for the heat gained by the water in the circulation pipe to overcome the heat loss to the environment, $q_p$ must be at least equal to $q_e$. By setting the above equations equal to each other and solving for $\dot{M}$, one can calculate the minimum required mass flow of water as:

$$\dot{M} = \frac{K\left(\frac{A}{B}\right)\Delta T_p}{C\Delta T_w}$$

As a non-limiting example, for the following data:
K=0.23 W/K·m (Nylon 6 engineering plastic, such as PA 6 30 GF available from RTP Company, Winona, Minn., USA)
A=0.0314 m²
B=3 mm (circulation pipe length=200 mm; diameter=50 mm)
$\Delta T_p$=30° C. (surroundings=−30° C.)
C=4200 J/kg·K
$\Delta T_w$=4° C. (entrance=4° C.; exit=0° C.)

The required mass flow $\dot{M}$ is 0.004872 kg/s, which is a volumetric flow of 17.54 liters per hour (l/h).

Test results for a 2 inch main water flow pipe and 16.5 mm diameter Pitot tube showed that for 1450 l/h water flow in the main water flow pipe, which is a water velocity of 0.21 m/s, the mass flow in the Pitot tube was 29.5 l/h, which is easily more than the required 17.54.

Tests were performed with two air valves installed in a water supply line: one air valve was equipped with a Pitot tube acting as the water circulation pipe and another air valve was the control and was not equipped with any water circulation pipe. The air valves and water supply line were maintained at very low temperatures (sub-freezing environment), and at one point in the test, ice was added to drop the temperature even further.

Figure 2:
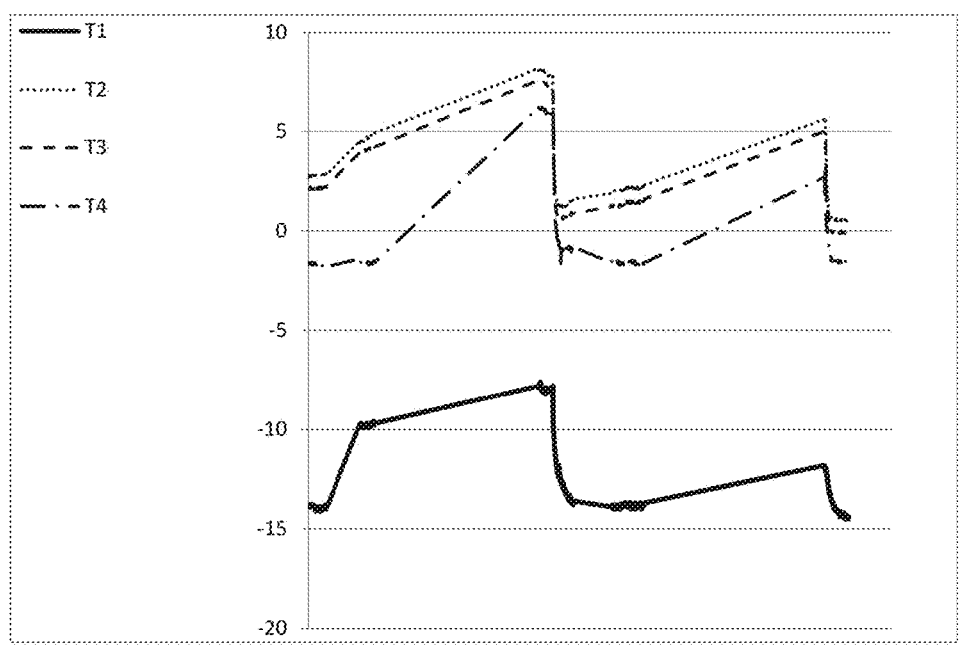
FIG. 2 is a simplified graphical illustration of test results which compared air valves and proved the efficiency of a water circulation pipe to prevent freezing in the valve.

FIG. 2 illustrates a graph of test results which compared the two air valves:
T1—temperature of the environment
T2—temperature of water in the supply line
T3—temperature of water in the valve with the Pitot tube
T4—temperature of water in the valve without the Pitot tube It is seen that the temperature of the air valve with the Pitot tube closely followed the temperature of the water in the water supply line, but the valve without the Pitot tube had significantly lower temperatures. (The two points in the graphs with sudden drops in temperature were when ice was suddenly added to the water.) The air valve without the Pitot tube exhibited ice all over the internal float of the valve. However, the air valve with the Pitot tube had very little ice formed, only at the sides of the valve with minute or no water flow; the float did not have ice buildup.

Figure 3A:
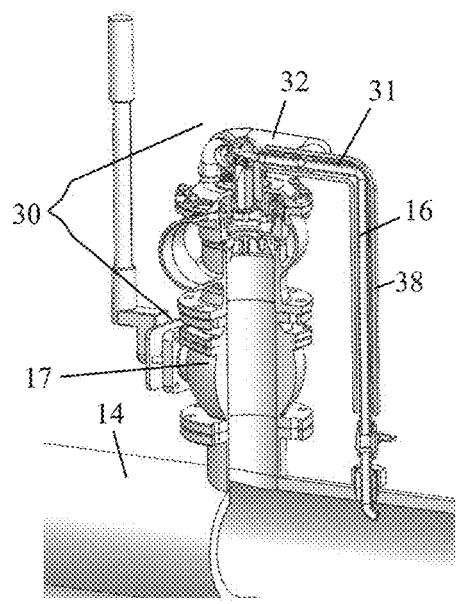
FIGS. 3A-3B are simplified illustrations of a valve assembly, constructed and operative in accordance with a non-limiting embodiment of the present invention, wherein the water circulation pipe branches into two branches.
Figure 3B:
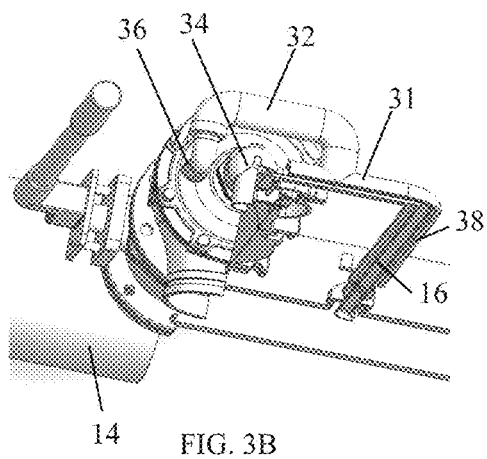

Reference is now made to FIGS. 3A-3B, which illustrate a valve assembly 30, constructed and operative in accordance with a non-limiting embodiment of the present invention. The water circulation pipe 16 branches into two branches 31 and 32: first branch 32 diverts water to a main valve 36 and second branch 31 diverts water to a secondary (pilot) valve 34. The water circulation pipe 16 including its two branches 31 and 32 may be covered by thermal insulation 38, such as but not limited to, polyurethane foam or tape.

An example of such a valve assembly is the D-070 Dynamic Combination Air Valve, commercially available from A.R.I. Flow Control Accessories Ltd., Israel. This valve operates without a float and uses a rolling diaphragm, which enables the valve to discharge air from the water system in a controlled and gradual manner, thus preventing slam and local up-surges. When vacuum (down-surge) occurs, the valve reacts quickly to admit large volumes of air into the water system, thus impeding down-surges and, consequently, all pressure surges in the line. The air and vacuum component of the dynamic air valve is normally closed when the line is not operating, thus preventing the infiltration of debris and insects into the water system.

Figure 4A:
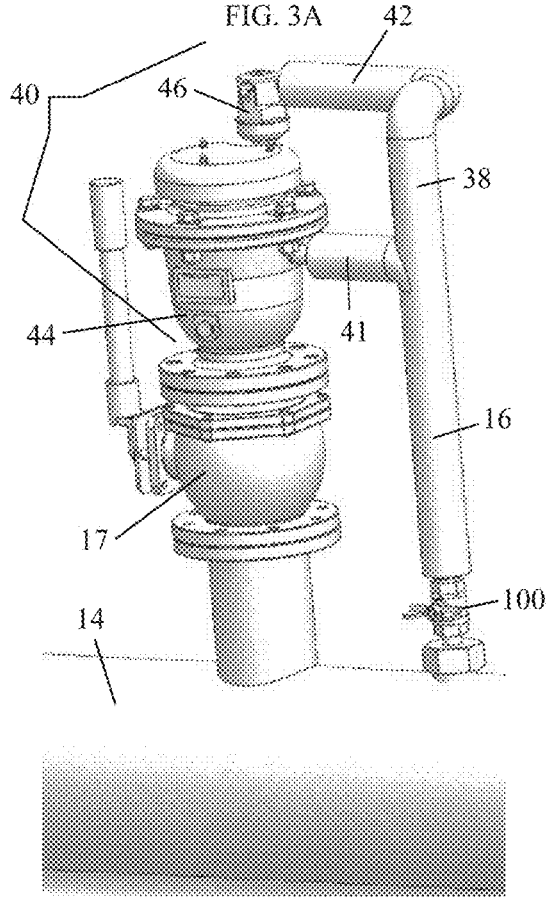
FIGS. 4A-4B are simplified illustrations of a valve assembly, constructed and operative in accordance with another non-limiting embodiment of the present invention, wherein the water circulation pipe branches into two branches.
Figure 4B:
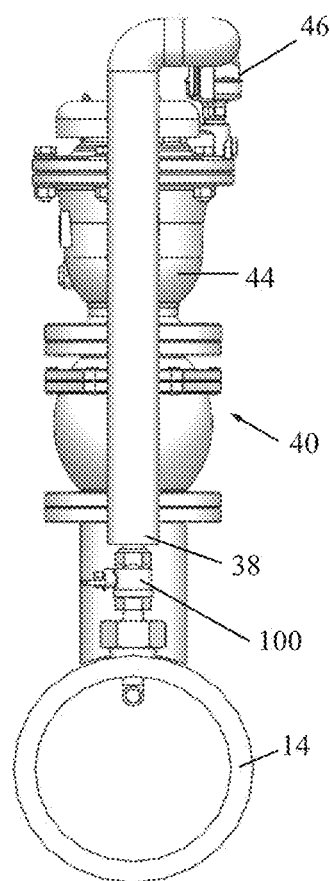

Reference is now made to FIGS. 4A-4B, which illustrate a valve assembly 40, constructed and operative in accordance with a non-limiting embodiment of the present invention. The water circulation pipe 16 branches into two branches 41 and 42: first branch 41 diverts water to a main (kinetic) valve 44 and second branch 42 diverts water to a secondary (automatic) valve 46. The water circulation pipe 16 including its two branches 41 and 42 may be covered by thermal insulation 38, such as but not limited to, polyurethane foam or tape. It is noted that in the present invention, the valve itself may also be covered with thermal insulation.

An example of such a valve assembly is the D-050/D-052 Combination Air Valve, commercially available from A.R.I. Flow Control Accessories Ltd., Israel. This valve has the features of both an air release valve and an air and vacuum valve.

Reference is now made to FIGS. 5A-5B, which illustrate a valve assembly 50, constructed and operative in accordance with a non-limiting embodiment of the present invention. An example of such a valve assembly is the D-025 Combination Air Valve, commercially available from A.R.I. Flow Control Accessories Ltd., Israel, and particularly useful is waste water systems. The valve combines an air and vacuum orifice and an air release orifice in a single body. The valve is specially designed to operate with liquids carrying solid particles such as wastewater and effluents. The combination air valve discharges air (gases) during the filling or charging of the system, admits air into the system while it is being emptied of liquid and releases accumulated air (gases) from the system while it is under pressure and operating.

The water circulation pipe 16 circulates the water in the valve above the air and vacuum orifice and an air release orifice.

Figure 6A:
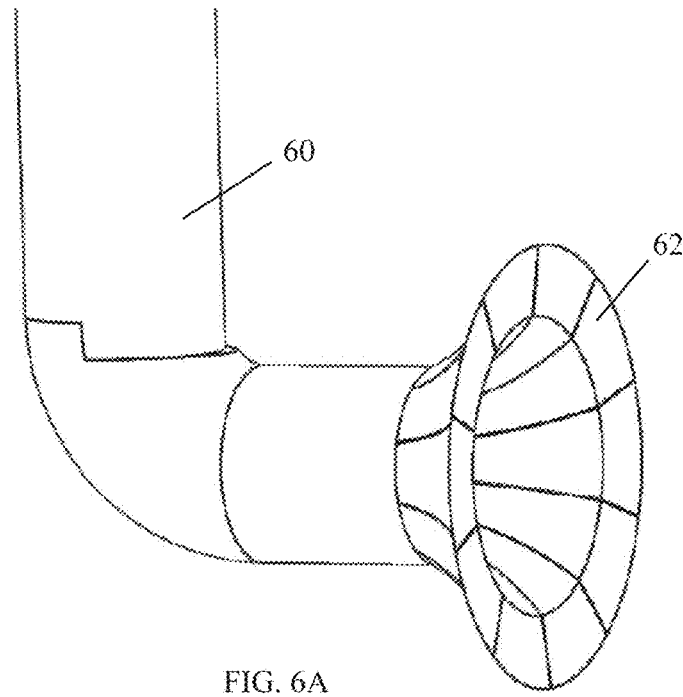
FIGS. 6A-6C are simplified illustrations of water circulation pipes with widened inlets, in accordance with non-limiting embodiments of the present invention.
Figure 6B:
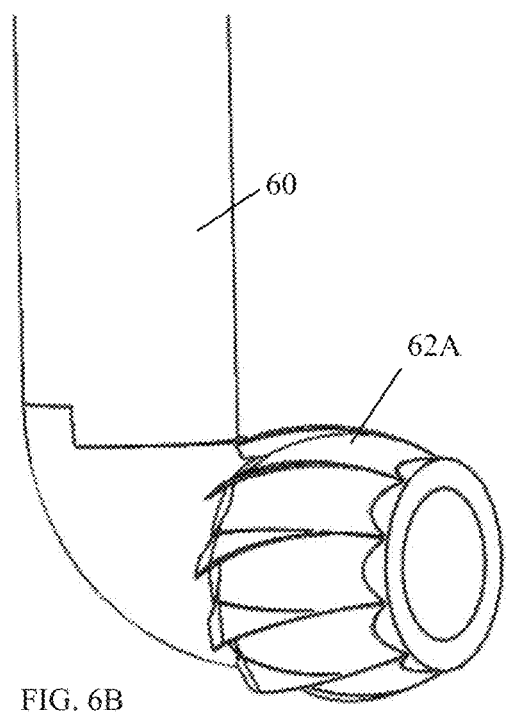
Figure 6C:
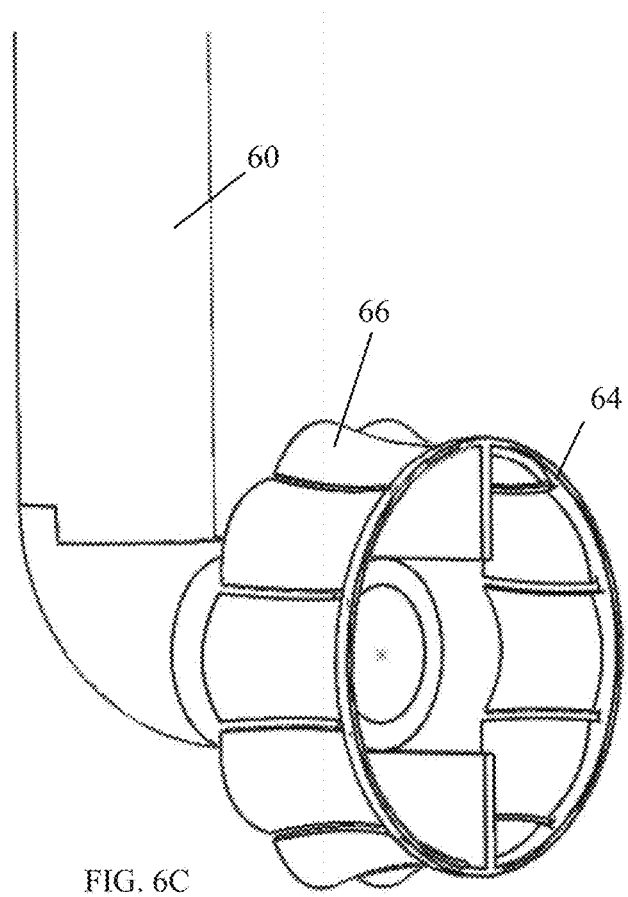

Reference is now made to FIGS. 6A-6C, which illustrate other types of water circulation pipes, in accordance with non-limiting embodiments of the present invention. In FIG. 6A, a water circulation pipe 60 (Pitot tube 60) includes a flexible or collapsible inlet 62, such as a bell-shaped inlet, or other shapes that form, or change shape into, a type of funnel inlet. Inlet 62 may serve to increase flow or flow velocity into the valve, particularly at low velocities where the drag caused by the funnel or bell shape is negligible compared to the benefits of increased area for water intake. Inlet 62 may be made of a flexible material, such as but not limited to, rubber, so that upon increased flow velocities the inlet 62 bends back over the pipe 60 to the shape 62A, as seen in FIG. 6B, thereby decreasing its area upon which the flow impinges, which decreases the flow resistance and decreases the pressure drop. FIG. 6C illustrates another kind of inlet 64 which is a ring-shaped inlet with trailing flaps 66 that face away from the flow direction. This type of inlet is particularly advantageous for small flows, in which the large ring-shaped or bell-shaped inlet increases the small flow into the pipe to a flow sufficient to prevent stagnation or freezing in the pipe and valve, and yet does not present a large flow resistance or pressure drop in the presence of larger and faster water flows.

Figure 7:
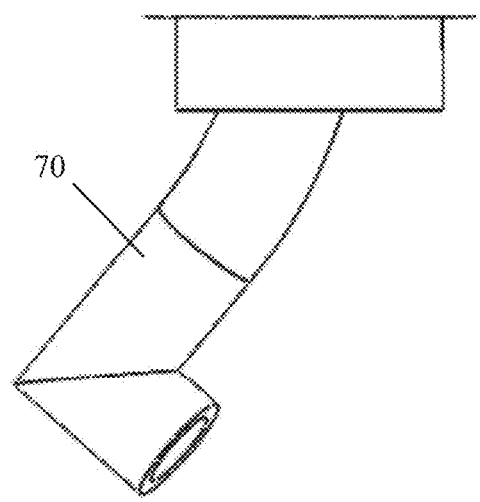
FIG. 7 is a simplified illustration of a water circulation pipe, made of a flexible material, in accordance with another non-limiting embodiment of the present invention.

Reference is now made to FIG. 7, which illustrates a water circulation pipe 70, in accordance with another non-limiting embodiment of the present invention. Pipe 70 is made of a flexible material, such as but not limited to, rubber, so that a portion of the pipe 70 bends or flexes during higher flow rates or velocity, thereby reducing the pressure drop.

Figure 8:
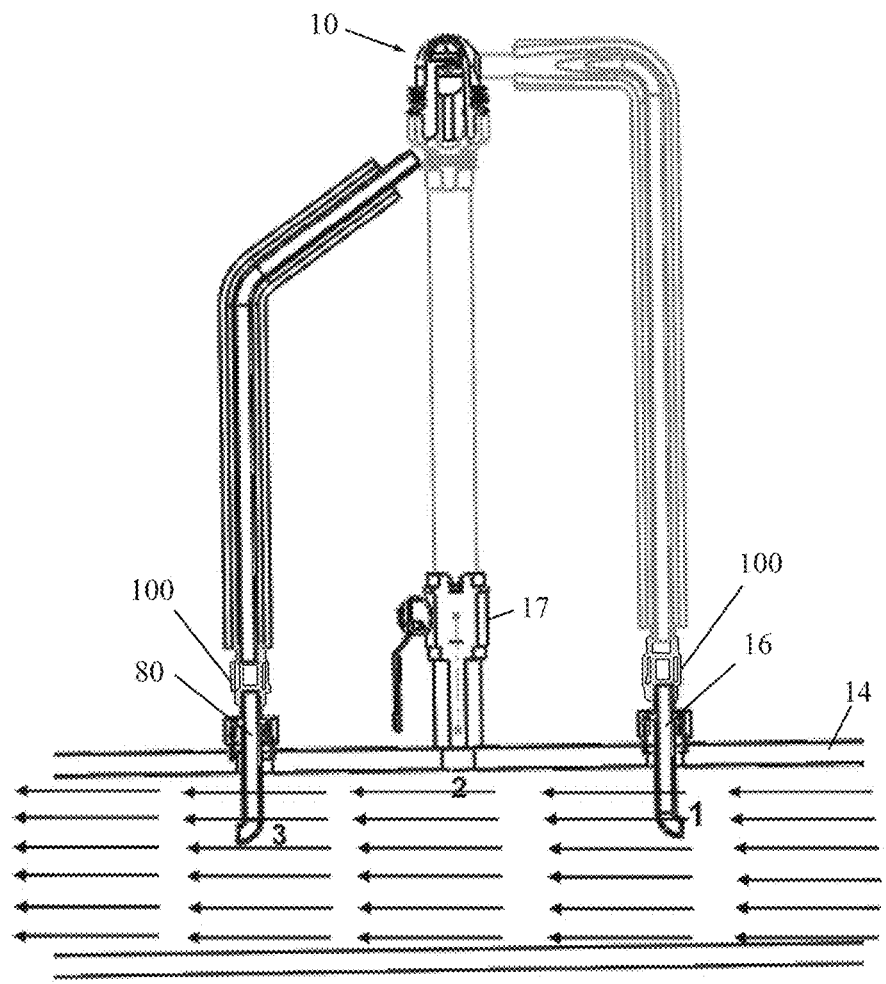
FIG. 8 is a simplified illustration of a water circulation pipe positioned to face downstream and/or upstream, in accordance with another non-limiting embodiment of the present invention.

Reference is now made to FIG. 8. In previous embodiments, the water circulation pipe faces upstream. In FIG. 8, a water circulation pipe 80 may be positioned to face downstream, or alternatively two pipes may be used, one pipe 16 facing upstream and the other pipe 80 facing downstream.

If only an upstream-facing pipe is used, the flow enters by positive pressure from the water flow stream into the valve body. If only a downstream-facing pipe is used, the flow enters by negative pressure into the valve body, that is, negative pressure forms in the vicinity of the inlet of the water circulation pipe (Pitot tube) and this negative pressure creates suction that forces water from the upstream flow of water to enter the inlet of the valve. If both upstream-facing and downstream-facing pipes are used, then the positive and negative pressures both force water into the valve body, which may be particularly useful for very slow flows for which a single water circulation pipe (Pitot tube) may be insufficient.

Figure 9:
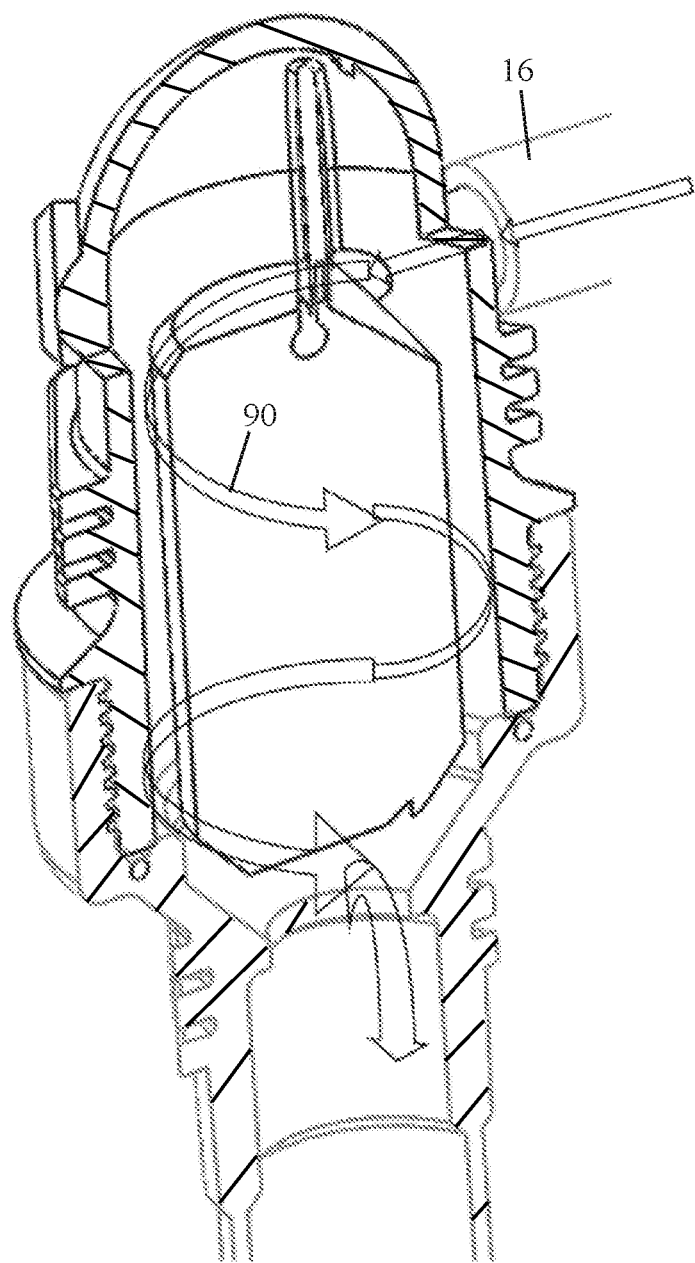
FIG. 9 is a simplified illustration of an effect caused by a different position of the water circulation pipe that introduces water off-center, in accordance with a non-limiting embodiment of the present invention.

Reference is now made to FIG. 9, which illustrates an effect caused by a different position of the water circulation pipe at the inlet to the valve body. The water circulation pipe may be positioned to introduce water into the valve body at the center of the upper inner volume of the valve body. In contrast, in FIG. 9, the water circulation pipe 16 introduces water off-center, such as along the inner perimeter of the valve body (in general, but not necessarily, the upper inner volume of the valve body). This causes a whirling effect 90 on the water flow and enhances the flow circulation to help prevent isolated spots of stagnation or freezing. The flow may be introduced tangentially or at a shallow angle along the inner perimeter of the valve body.

Figure 10:
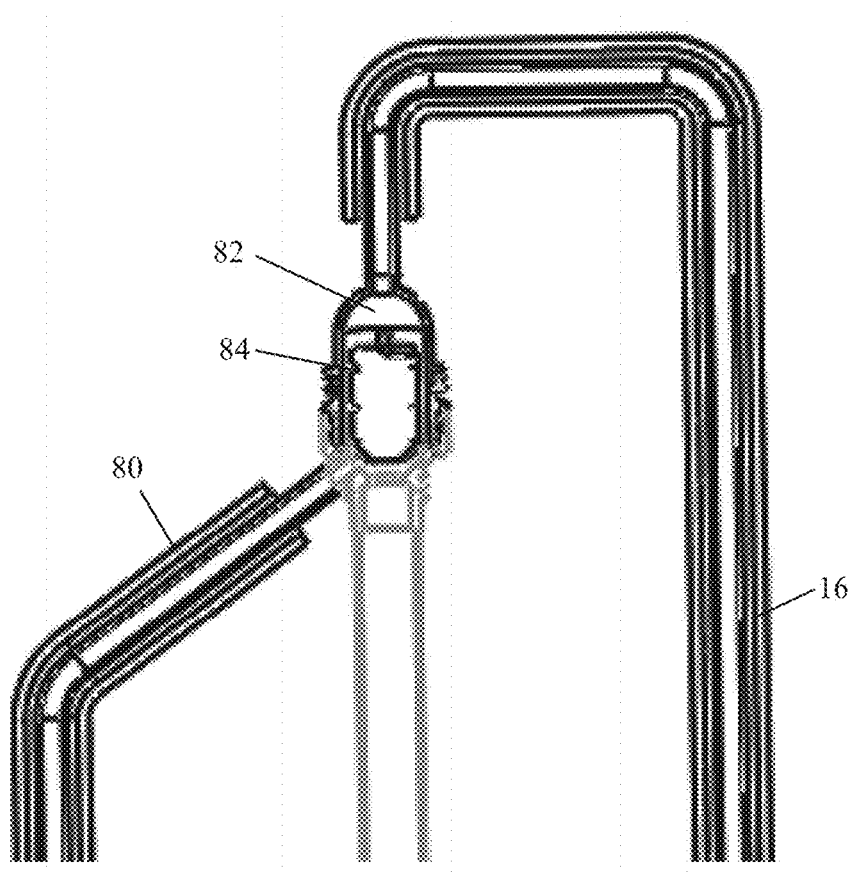
FIG. 10 is a simplified illustration of a water circulation pipe introducing water into the top of the valve body, in accordance with a non-limiting embodiment of the present invention.

FIG. 10 illustrates the water circulation pipe 16 introducing water into the top of the valve body (the exit is at the bottom of the valve body), but as opposed to FIG. 9, the water is introduced at the center of the valve body.

A small filter 82 may be placed in the water circulation pipe 16 or at its inlet or outlet to prevent debris from entering the valve. The system may include one or more sensors 84, such as but not limited to, temperature sensors, pressure sensors, flow sensors and the like, for sensing changes in temperature, pressure or flow velocity in the flow line or valve. The sensed information may be sent to a controller for controlling or modifying performance of the system. For example, if the temperature is reaching freezing or if the flow is very small, the system may issue an alarm, which may alert of a blockage in the flow line that prevents the water circulation pipe from properly circulating the water.

One or more separation valves 17 and/or 100 may be optionally provided in the valve system (as seen in FIGS. 3A, 4A, 4B, 5A, 5B and 8). The separation valves 17 and 100 enable performing maintenance tasks in the valve system while the water line is under pressure. Valve 100 may also serve to ensure the Pitot tube points in the desired direction, either upstream or downstream. The valves may be mechanical, hydraulic, pneumatic, or electric or any combination thereof, with local or remote control.

What is claimed is:

1. A valve assembly comprising:
a valve installed in a water supply line; and
a water circulation pipe that has a first end in fluid communication with a water supply line and a second end in fluid communication with an inner volume of said valve, such that some water flowing in said water supply line is diverted through said water circulation pipe and circulates in said valve, and wherein said valve comprises an air release valve and/or an air and vacuum valve and said water circulation pipe branches into a plurality of branches both of which are in fluid communication with different portions of said valve.

2. The valve assembly according to claim 1, wherein the water that is diverted through said water circulation pipe and circulates in said valve has a sufficient flow to prevent freezing in said valve.

3. The valve assembly according to claim 1, wherein the water that is diverted through said water circulation pipe and circulates in said valve has a sufficient flow to prevent water stagnation in said valve.

4. The valve assembly according to claim 1, wherein said water circulation pipe comprises a Pitot tube.

5. The valve assembly according to claim 1, wherein said second end of said water circulation pipe is in fluid communication with an upper inner volume of said valve.

6. The valve assembly according to claim 1, wherein an inlet to said water circulation pipe faces upstream with respect to said valve.

7. The valve assembly according to claim 1, wherein an inlet to said water circulation pipe faces downstream with respect to said valve.

8. A valve assembly comprising:
a valve installed in a water supply line; and
water circulation pipes, each of which has a first end in fluid communication with a water supply line and a second end in fluid communication with an inner volume of said valve, such that some water flowing in said water supply line is diverted through said water circulation pipes and circulates in said valve, and wherein said valve comprises an air release valve and/or an air and vacuum valve and wherein an inlet to one of said water circulation pipes faces upstream with respect to said valve and an inlet to another of said water circulation pipes faces downstream with respect to said valve.

9. The valve assembly according to claim 1, wherein said water circulation pipe or said valve is covered by thermal insulation.

10. The valve assembly according to claim 1, wherein said water circulation pipe comprises a widened inlet.

11. The valve assembly according to claim 10, wherein said widened inlet is flexible and bendable to decrease its area.

12. The valve assembly according to claim 1, wherein said water circulation pipe is flexible to flex or bend due to the water flowing in said water supply line.

13. The valve assembly according to claim 1, wherein said water circulation pipe is positioned to introduce water centrally into said inner volume.

14. The valve assembly according to claim 1, wherein said water circulation pipe is positioned to introduce water off-center into said inner volume.

15. The valve assembly according to claim 1, further comprising a filter placed in said water circulation pipe or at one of said ends of said water circulation pipe.

16. The valve assembly according to claim 1, further comprising one or more sensors operative to sense changes in temperature, pressure or flow velocity in said valve assembly.

* * * * *